| e1 | e2 | e3 | a1 | a2 |
|---|---|---|---|---|
| 0 | 0 | 0 | 0 | 0 |
| 0 | 1 | 0 | 1 | 1 |
| 1 | 1 | 0 | 1 | 1 |
| 1 | 0 | 0 | 1 | 0 |
| 0 | 0 | 1 | 0 | 0 |
| 0 | 1 | 1 | 1 | 1 |
| 1 | 1 | 1 | 1 | 1 |
| 1 | 0 | 1 | 0 | 0 |

I $t_i + t_D \leqq t_{Fab} \leqq t_{Fi}$

II $t_i + t_D \leqq t_{Fab} \leqq t_{Fi}$ ; $t_D \geqq t_{p-prel}$

Sept. 19, 1967 G. E. GATTNER ET AL 3,342,939
SYSTEM FOR MONITORING AND PICK-UP OF SIGNAL PULSES OCCURRING AT RANDOM SEQUENCE ON SIGNAL LINES WITH OR WITHOUT INTERPOSED CONNECTING DEVICES, IN PARTICULAR, TARIFF-CHARGE PULSES IN TELEPHONE INSTALLATIONS
Filed March 20, 1964 8 Sheets-Sheet 3

SYSTEM FOR MONITORING AND PICK-UP OF SIGNAL PULSES OCCURRING AT RANDOM SEQUENCE ON SIGNAL LINES WITH OR WITHOUT INTERPOSED CONNECTING DEVICES, IN PARTICULAR, TARIFF-CHARGE PULSES IN TELEPHONE INSTALLATIONS

Filed March 20, 1964

| e1 | e2 | e3 | a1 | a2 |
|---|---|---|---|---|
| 0 | 0 | 0 | 0 | 0 |
| 0 | 1 | 0 | 0 | 1 |
| 1 | 1 | 0 | 0 | 1 |
| 1 | 0 | 0 | 1 | 0 |
| 0 | 0 | 1 | 1 | 0 |
| 0 | 1 | 1 | 1 | 1 |
| 1 | 1 | 1 | 1 | 1 |
| 1 | 0 | 1 | 1 | 0 |

I $t_i + t_D \leqq t_{Fab} \leqq t_{Fi}$

II $t_i + t_D \leqq t_{Fab} \leqq t_{Fi}$ ; $t_D \geqq t_{p-prel}$

| e1 | e2 | e3 | a1 | a2 |
|---|---|---|---|---|
| 0 | 0 | 0 | 0 | 0 |
| 0 | 1 | 0 | 0 | 0 |
| 1 | 1 | 0 | 1 | 1 |
| 1 | 0 | 0 | 1 | 0 |
| 0 | 0 | 1 | 0 | 0 |
| 0 | 1 | 1 | 0 | 0 |
| 1 | 1 | 1 | 1 | 1 |
| 1 | 0 | 1 | 0 | 0 |

I $t_i \leqq t_{Fab} \leqq t_{Fi} - t_D$

II $t_i \leqq t_{Fab} \leqq t_{Fi} - t_D$ , $t_D \geqq t_{p-prel}$

Sept. 19, 1967 G. E. GATTNER ETAL 3,342,939

SYSTEM FOR MONITORING AND PICK-UP OF SIGNAL PULSES OCCURRING AT RANDOM SEQUENCE ON SIGNAL LINES WITH OR WITHOUT INTERPOSED CONNECTING DEVICES, IN PARTICULAR, TARIFF-CHARGE PULSES IN TELEPHONE INSTALLATIONS

Filed March 20, 1964 8 Sheets-Sheet 6

| e1 | e2 | e3 | a1 | a2 |
|---|---|---|---|---|
| 0 | 0 | 0 | 0 | 0 |
| 0 | 1 | 0 | 0 | 0 |
| 1 | 1 | 0 | 0 | 1 |
| 1 | 0 | 0 | 1 | 0 |
| 0 | 0 | 1 | 1 | 0 |
| 0 | 1 | 1 | 0 | 0 |
| 1 | 1 | 1 | 1 | 1 |
| 1 | 0 | 1 | 1 | 0 |

I $t_i \leqq t_{Fab} \leqq t_{Fi} - t_D$

II $t_i \leqq t_{Fab} \leqq t_{Fi} - t_D$ ; $t_D \leqq t_{p-prel}$ 3,342,939

SYSTEM FOR MONITORING AND PICK-UP OF SIGNAL PULSES OCCURRING AT RANDOM SEQUENCE ON SIGNAL LINES WITH OR WITHOUT INTERPOSED CONNECTING DEVICES, IN PARTICULAR, TARIFF-CHARGE PULSES IN TELEPHONE INSTALLATIONS

Günther E. Gattner, Munich, Ullrich Tanke, Grafelfing, and Karl-Heinz Widdel, Munich, Germany, assignors to Siemens & Halske Aktiengesellschaft, Berlin and Munich, Germany, a corporation of Germany Filed Mar. 20, 1964, Ser. No. 353,625
Claims priority, application Germany, Mar. 22, 1963, S 84,296
10 Claims. (Cl. 179—7.1)

ABSTRACT OF THE DISCLOSURE

A system for the central registration of signal impulses arriving on various signal lines with or without interposed communication devices, in random sequence, but with a certain minimum time interval, in which the incoming signals are temporarily stored, and the storage states cylindrically scanned by a double pulse from which a binary control signal is formed which is intermediately stored for subsequent comparison, an evaluation switching member being provided for evaluating the intermediately stored signal and the results of the succeeding scanning, and causing the registration and/or storage of the individual signal impulses and/or of a new control signal.

For the central pick-up of signal impulses incoming at random sequence but at a certain minimum time separation, for example, of tariff-charge pulses in telephone installations, it has been known practice to allocate to the signal lines bistable storage elements, for example, cold cathode tubes or ferromagnetic ring cores, for the temporary storage in each case of one of the incoming signal impulses individually, so that the signal pulse to be recorded is extended in a simple manner beyond the actual pulse duration. Since such bistable storage elements are not suitable for counting, each storage element has to be evaluated prior to the arrival of the following signal pulse and the information has to be recorded at another place.

In one of these known methods the individual signal pulses are led into the storage elements over a series connected individual differentiating member, and the storage elements are switched into their storage position by short duration pulses obtained in such manner. With the scanning and evaluation of the storage state of the storage element, such element is switched back into its rest position, so that the following scanning impulses cannot cause any further registration. In this case the maximum allowable pulse-sequence-time of the scanning impulses for a faultless pick-up of the incoming signal pulses corresponds—if the duration of the respective infed pulse can be disregarded—to the minimum pulse sequence time of the incoming signal pulses, so that, accordingly approximately the full signal pulse period, namely the duration of the impulse and that of the following interval is available for evaluation.

The present invention relates likewise to a system for central pick-up of signal pulses incoming on several signal lines, with or without interposed connecting devices, at random sequence, but at certain minimum time intervals of the incoming signals, for example, tariff charge impulses in telephone installations. Use is made of the signal lines or series connected devices, for example, of a relay set of the first group selector stage with individually allocated bistable storage elements, for example ferromagnetic ring cores, for the temporary storage of each signal pulse, which, for the determination of its particular storage position is successively, or upon demand, cyclically scanned.

The basic system according to the present invention avoids a considerable expenditure for the individual differentiating members. In the present system the evaluating pulses consist of two pulses of the same polarity, following one another at brief intervals, each of which is capable of switching the storage element to be scanned into the readout condition even in the case of the simultaneous presence of a signal pulse. The pulse sequence time of the scanning pulses, designed as a double pulse, is equal to or smaller than the smallest pulse sequence time of the signal pulses to be picked up, but greater or at least equal to the minimum duration of the effective signal pulses. The evaluation results obtained through the double pulse, together with a control signal obtained in each case in the preceding evaluation and intermediate storage, for a registration still to be made or already made, control an evaluation switching member constructed of circuit elements of known type. This member, taking into consideration the basic time conditions relating to the scanning, and dependent upon the triple factors, resulting from the two evaluation results and the control signal in each case, causes the registration and/or storage of the individual signal impulses, and/or of a new control signal.

Due to the possibility of only a brief restoration of the storage elements to their rest position, even if a signal impulse remains in line, it is first of all achieved that with a uniform evaluation method the scanning produces, at least for the duration of a signal pulse, a uniform evaluating signal, for example "1." Thus it is furthermore possible to develop the evaluation impulses as a double pulse, so that two evaluations results are obtained with a single scanning operation, whereby the beginning, the continuation and the end of a signal pulse, as well as the interval between two pulses can be directly recognized by the different result-sequences "0"–"1," "1"–"1" and "1"–"0" as well as "0"–"0." By improving the condition as to time that the period of the scanning impulses is greater or at least equal to the duration of the longest active signal impulse, the possibility of a combination of sequences resulting from several successive scannings is limited in such a manner that the presence of a single signal pulse is characterized only by the single appearance of one of the two possible result sequences "0"–"1" or "1"–"1," and the end, or the following interval by the result sequences "1"–"0" or "0"–"0." Based on this limited number of possible combinations of the result-sequences of several successive scannings there is provided, in a simple manner with the aid of a further control signal as a characterizing indication for a completed or yet to be completed registration of the signal impulse already recognized, which is temporarily stored in the form of spot-marking until the next scanning, there is provided the possibilty of eliminating a multiple counting of one and the same signal impulse.

The basic system thus permits two equivalent evaluation possibilities. In the one, the evaluation switching member causes the registration of a signal pulse, as soon as such a pulse is recognized by the result sequence produced by the respective evaluation double pulse, and the respective registration effected is in each case characterized by the storage of a corresponding control signal, but only in the case of a recognized signal pulse and registration has not been effected by a previous evaluation.

In the other possibility the evaluation switching member causes the registration of a signal pulse as soon as the end of such a pulse is clearly recognized by the result sequence "1"–"0" produced by the double pulse. On the other hand, when a recognized signal pulse is present for the first time, there is stored merely a control signal characterizing the registration still to be effected, and by reason of this control signal a registration is effected in the subsequent evaluation, a new control signal simultaneously being stored in case the presence of a signal pulse is again recognized.

In the first case, therefore, immediately on the recognition of a signal pulse, registration is effected and this operation is characterized by the storage of the control signal until the next evaluation. In the other case, no registration is initially effected, but there is merely caused the intermediate storage of the control signal characterizing the registration still to be effected, which only in the succeeding evaluation leads to a registering of the already recognized signal pulse.

In order, in both systems, to avoid false counts in every case, the pulse sequence time of the scanning impulses must not be less than the duration of the longest effective signal pulse extended by the evaluation time for the double pulse.

In another possibility, the evaluation switching member evaluates exclusively the result sequence "1"–"1" as a signal for the recognized presence of a signal pulse, with the result sequence "0"–"1" having no effect on the evaluation. Here, in the normal case, the pulse sequence time for the scanning impulses must not be greater than the duration of the evaluation pulse, for the smallest pulse sequence of the signal pulses to be picked up.

This time condition may, however, be disregarded if the smallest pulse sequence of the signal pulses to be picked up form a continuous direct-current pulse. There thus results for this method the advantage of a most general applicability, such as is not available in any of the known methods.

All the methods derived from the general concept are usable without limitation, for a pick-up of signal pulses distorted by rebound of the signal forming contacts if the time interval of the two impulses forming the evaluation pulse is greater than the greatest possible rebound interval. The possibility that the two pulses forming the evaluation pulse may possibly fall into one and the same rebound interval and their result sequence simulates a signal pulse end, is thereby avoided. By this time requirement it is achieved, that the scanning of the storage elements, even in the case of signal pulses distorted by rebounding, produces for the entire pulse duration inclusive of the rebounds a uniform interrogation result, namely "1."

The maintenance of such additional time requirement is possible without additional expenditure, resulting in considerable further advantages over the known state of the art. In order to definitely preclude multiple countings in the known method, the differentiating members must be designed in such a way that they flip the associated storage element into the storage position only subsequent to the maximum possible rebound time, so that the pulse sequence time for the scanning pulses is shortened, even if not to the same degree. Moreover, generally it is not possible to construct such differentiating members by simple RC members, so that likewise the expenditure required for them increases considerably.

In the drawing is shown an exemplary embodiment of the present invention and the corresponding evaluation switching members of the individual methods.

Figure 1:
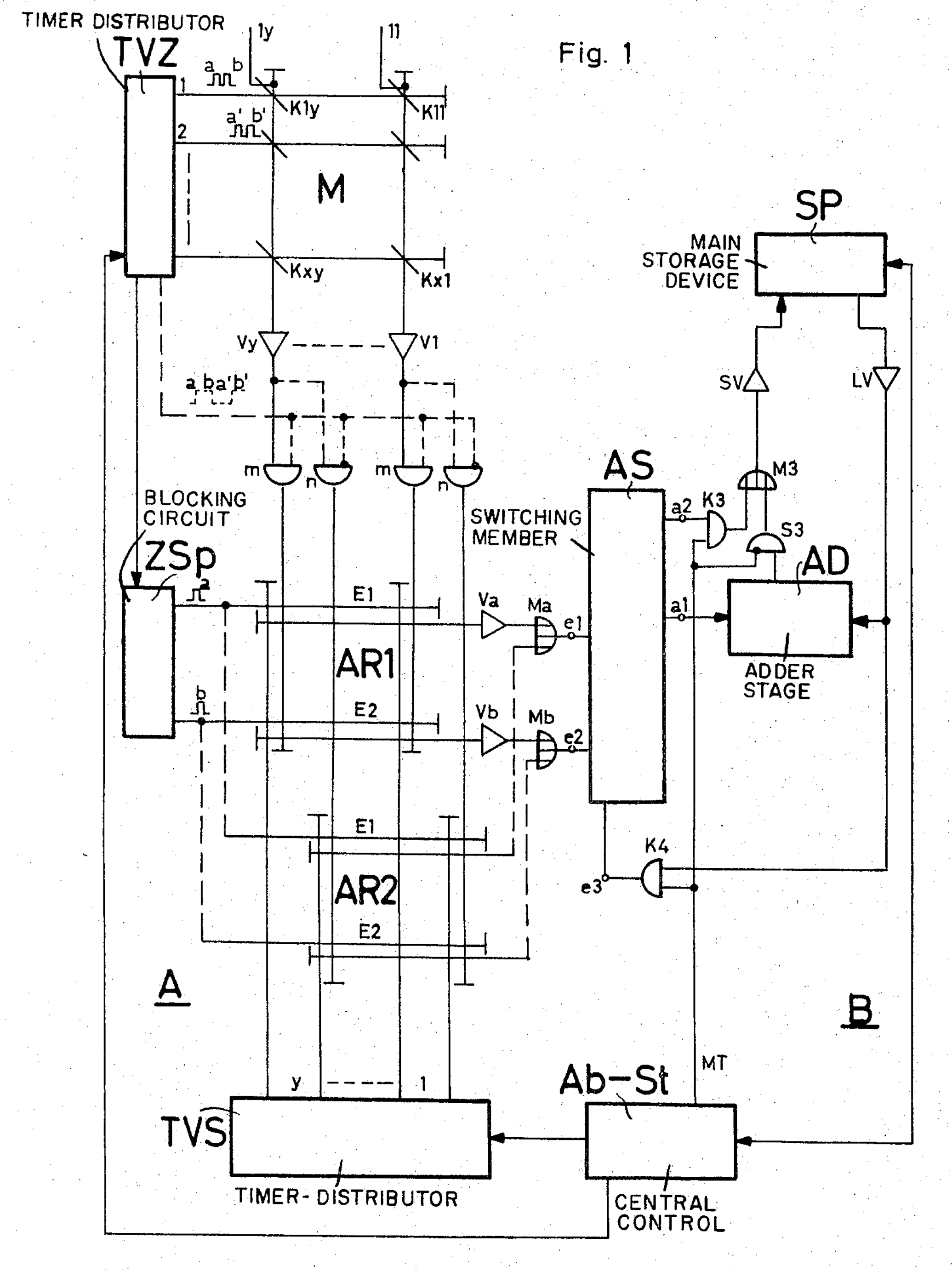
FIG. 1 shows a switching arrangement for carrying out the individual methods.

The circuits of FIG. 1 are arranged in two parts A and B, which are connected with each other by the evaluation switching member AS.

Part A serves for the directing of the signal pulses incoming in random sequence on the signal lines 11 to 1*y* of a local multiplex system into a time multiplex system. To each signal line 11 to 1*y* there is allocated for this purpose a bistable storage element K11 to K1*y*, for example in the form of a ferromagnetic ring core, which are expediently grouped in the form of a matrix M.

The cyclic evaluation or reading out of the individual storage elements takes place according to a known method, in such a way that with a single evaluation pulse the storage elements, for example K11 to K1*y*, of a whole line are simultaneously evaluated and the information items contained in the evaluated storage elements are transmitted in parallel over the lines 1 to *y* to an evaluation register AR1. This register has, corresponding to the evaluation results derived from the scanning impulse formed as a double pulse, two groups, E1 and E2, of storage elements which are alternately switched by the line-blocking circuit ZS*p* into pulse-receiving condition, in such a manner that in each case the evaluation results obtained through a first pulse *a* pass to the storage group E1 and the evaluation results obtained through the second pulse *b* pass to the storage group E2. By stepwise scanning of the corresponding evaluation results in the individual storage groups the fed-in information group is converted into an information series which is fed over the outgoing lines of the two storage groups and connected amplifiers V*a* and V*b*, respectively, to the corresponding inputs *e*1 and *e*2, respectively, of the evaluation switching member AS. The reading out or evaluation of the storage elements allocated individually to the individual signal lines and of the evaluation register is controlled through the timer distributors TVZ and TVS.

Part B is formed by a central registering and storage device with a central start or operational control. The main storage device SP contains a number, corresponding to the number of signal lines to be monitored, of individual storage elements in the form, for example, of storage fields on a magnetic drum or a ring core cell of a ring core storage field, each one of which is continuously allocated to a signal line. These individual storage elements serve for the actual storage of the number of signal pulses incoming in each case on the allocated signal lines. The storage is accomplished expediently in a binary code, for example in tetrad coding. The storage capacity is governed according to the maximum signal impulse numbers to be stored.

The summation of the signal pulses, incoming at random to each signal line takes place by means of the adder stage AD. For this purpose the information items characterizing the signal impulses accumulated so far for each signal line are continuously fed over a reading amplifier LV to the adder stage and from there again to the main storage device. It is immaterial in the present method whether present, unchanged information is newly registered each time or a re-registering takes place only when the present information has changed, as in the example illustrated.

This possibly constantly repeated circuit is synchronized over the central start or operational control A*bSt* with the evaluation cycle of part A of the apparatus and in such manner that with each transfer of an information item to the adder device the information content of the storage element K . . . allocated to the corresponding signal line is simultaneously evaluated.

The decision as to when an addition shall take place is made by the evaluation switching member AS, which connects the two parts A and B of the apparatus. This evaluating switching member consists, according to the nature of the basic method, of one or more circuit elements, in themselves known, such as coincidence, blocking and mixing gates. The output *e*1 characterizes always the first evaluation result obtained through the evaluation double pulse and *e*2 always the second, while over the input *e*3 the temporarily stored control signal is fed. Of the two outputs *a*1 and *a*2, the first delivers the particular registering signal and the second the storage signal to the intermediate storage until the next evaluation. For this purpose there is provided a storage member arranged inside each individual storage element in the main storage SP, which member is expediently placed ahead of the actual information storage. The information content of this storage member, in series delivery, is branched off from the main storage over a coincidence gate K4 from the information going to the adder stage AD, by a method such that this gate is opened by the central start or operational control A*b*–S*t*, only for the time M*t* for the reception control signal at such storage member, or else it passes, in the case of parallel delivery from the main storage directly to the input *e*3 of the evaluation switching member AS. The control time M*t* is further regulated by the in-phase storage of a new control signal over the coincidence grid K3, and over the blocking gate S3 prevents the simultaneous influencing of the read-in or recording amplifier SV by the adder stage AD.

The design of the evaluation switching member AS can be varied. The embodiment according to FIG. 2 operates according to the corresponding result sequence chart illustrated in FIG. 2*b*, in such a manner that the registering of a signal impulse is effected over the output *a*1 as soon as such an impulse is recognized that is in the two result sequences "0"–"1" and "1"–"1," which are evaluated by the blocking gate S1 and the coincidence gate K1. Simultaneously, a control signal characterizing the accomplished registration is delivered at the output *a*2. This prevents, over blocking gate S2, the result that an impulse end "1"–"0" recognized in the succeeding evaluation will have as its consequence the repeated registering of the already registered control pulse.

Figures 2A, 2B:
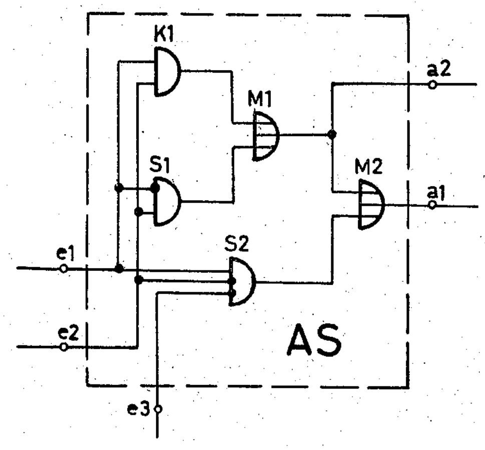
FIGS. 2 to 5 show four different evaluation switching members with the corresponding sequence chart and the pulse diagrams.
Figure 2C:
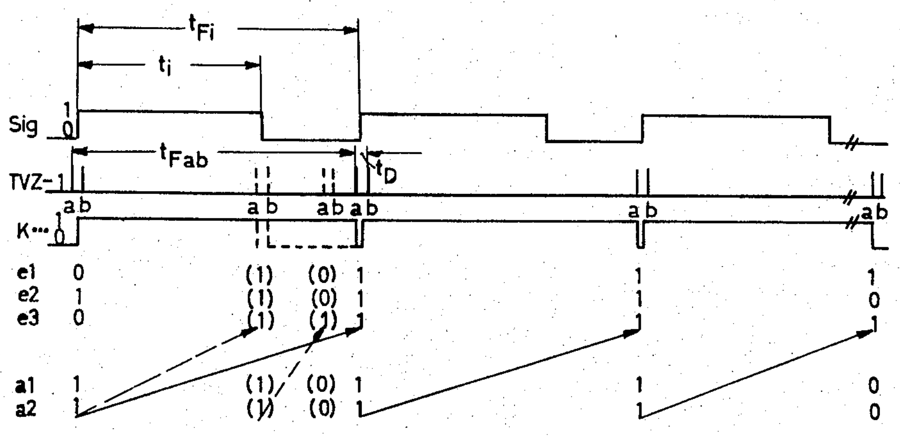

FIG. 2*c* illustrates a corresponding pulse diagram. The upper pulse curve represents the signal voltage occurring on any signal line, for example 11, of FIG. 1. Below it is represented the scanning pulse sequence applied to the corresponding storage element K11, the storage conditions, the input signals *e*1, *e*2 and *e*3 for each evaluation, and also the output signals *a*1 and *a*2 of the evaluation switching member resulting in each case.

As long as the storage element K . . . is in the storage position "1" there likewise results as an evaluation result a "1," which in view of a uniform evaluation method is derived from the restoration of the storage elements taking place each time. It is immaterial what phase position the evaluation double pulse *a*–*b* occupies with respect to the particular arriving signal pulses. In each case a signal pulse is registered only once if the pulse sequence time $t_{Fab}$ for the scanning pulses is, on the one hand, equal to or smaller than the smallest pulse sequence time $t_{Fi}$ of the signal pulses to be picked up and, on the other hand, is equal to or greater than the active pulse duration $t_i$ extended by the evaluation time $t_D$ for the evaluation double pulse *a*–*b*. If the last mentioned time conditions were not maintained, as is indicated by the evaluation in pulse drawn in broken lines, one and the same signal inpulse would be doubly counted, since both in the result sequence "0"–"1" and also in the result sequence "1"–"1" following, arising from the same signal pulse, a registration would be effected.

Figure 2D:
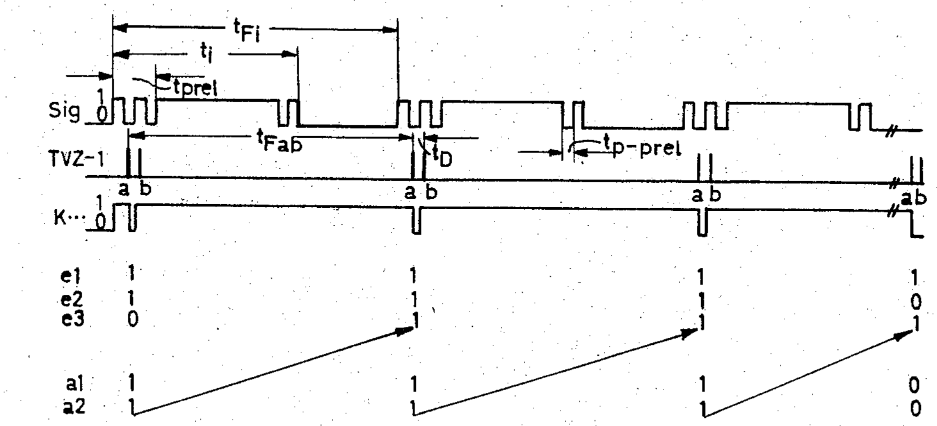

The same method is likewise suitable for the pick-up of signal pulses distorted by rebound of the signal-producing contacts, as shown in the pulse diagram according to FIG. 2*d*. Without additional time limitation on the duration of the evaluation double pulse, however, there exists the danger of a false counting, if both pulses of the evaluation double pulse fell into one and the same rebound interval or gap, since thereby a premature pulse end is simulated. In the one case, since the pulse pause that follows delivers the same result sequence, at least one pulse too many would be registered, if, in the case of maximum admissible pulse sequence time of the scanning pulses, as effected by the non-uniformity of the rebound phenomena, for example at the beginning of each signal pulse, there will alternately be delivered the result sequence "1"–"1," "1"–"0"–"1"–"1," "1"–"0," etc., in which case all the result sequences are derived from different signal pulses. The last mentioned fault could be avoided by a corresponding shortening of the maximum admissible sequence time.

The error percentage resulting is, to be sure, very small and becomes smaller as the duration of the evaluation double pulse is increased, since with increasing evaluation pulse duration the probability becomes less and less that an evaluation pulse will fall into a rebound interval or gap. False counts are, on the other hand, completely precluded if the duration $t_D$ for the interrogation double pulses is equal to or greater than the greatest possible rebound gap $t_{p\text{-}prel}$, since the scanning in this case, similarly to the case of undistorted signal pulses, produces at least for the whole pulse duration, inclusive of the rebounds, a uniform evaluation result, namely "1."

Figures 3A, 3B:
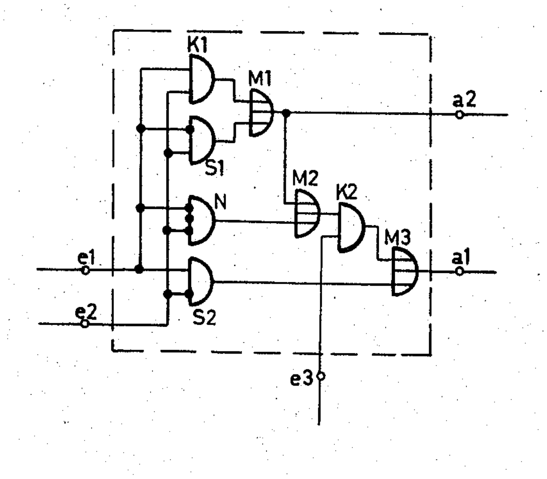

The evaluation switching member represented in FIG. 3*a* operates according to the result sequence chart illustrated in FIG. 3*b* in such a way that on recognition of a signal pulse, based upon the result sequences "0"–"1" or "1"–"1" which are evaluated through the blocking gate S1 and the coincidence gate K1, such signal pulse is not immediately registered but merely a control signal, characterizing the registration still to be made, is delivered at the output *a*2. Upon the succeeding evaluation, as a result of this control signal, a registration initiating signal or command is transmitted over the coincidence gate K2, in which process, it is possible that a renewed control signal is delivered, in the event that the end of a signal pulse is not clearly recognized by the result sequence "1"–"0" or "0"–"0." It is only in the case of a signal pulse end, characterized by the result sequence "1"–"0," which is monitored with the blocking gate S2, whereby without regard to a possible presence of a control signal, that registration is made immediately, since otherwise the result sequence to be released would be lost. The negator N, which, as is well known, leads a signal at the output only if both control inputs are free of signals, monitors the result sequence "0"–"0," which, together with a control signal at the output *e*3, results in a registration initiating signal command. This occurs when the preceding evaluation pulse coincides with a signal pulse end and the storage element afterwards remains in the rest position. The resulting sequence "1"–"1" in this case, however, delivers only one control signal, which, accordingly results in a registering command at the output only upon monitoring of the succeeding results sequence "0"–"0."

Otherwise, the same assumptions apply which have already been mentioned in the previously described evaluation method.

Figures 4A, 4B:
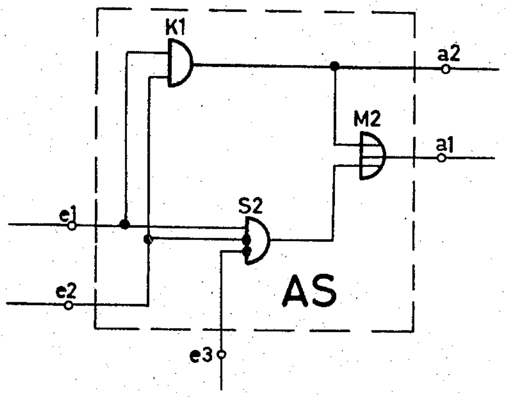
Figures 5A, 5B:
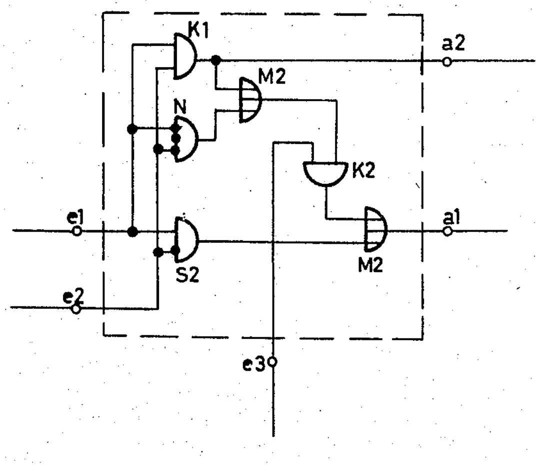

The evaluation switching members according to FIGS. 4*a* and 5*a* differ from those illustrated in FIGS. 2*a* and 3*a* merely in that the blocking gate S1 monitoring the result sequence "0"–"1" and the subsequently connected mixing gate M1 are omitted. Corresponding to the appropriate result sequence charts of FIGS. 4*b* and 5*b*, this result sequence, in contrast to the two aforementioned systems, remains without effect. Thereby, the number of the result sequence characterizing the presence of a signal pulse is reduced to one possibility, namely "1"–"1," so that the pulse sequence time $t_{Fab}$ of the scanning pulses needs merely to be equal to or greater than the active pulse duration $t_i$.

Figure 4C:
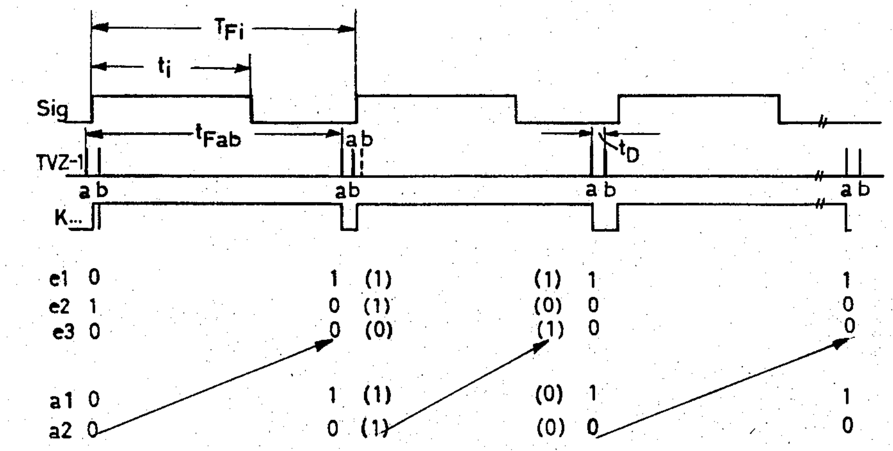

To be sure, in both these systems the maximum admissible pulse sequence time $t_{Fab}$ for the scanning pulses, which in the two systems heretofore described is equal to the smallest pulse sequence time $t_{Fi}$ of the occurring signal impulses, shortened by the duration $t_D$ of the evaluation double pulse. The reason for this is readily seen from the corresponding pulse diagram according to FIG. 4c for the evaluation switching member according to FIG. 4a, which otherwise corresponds to FIG. 2c. If the pulse sequence time $t_{Fab}$ is so selected that successive scanning pulses always coincide with the beginning of successive signal pulses, as is indicated by the second evaluation pulse, illustrated in broken lines, as indicated by the input and output values set forth in brackets for e1, e2, e3 and a1, a2 of the evaluation switching member, the first signal pulse of a pulse sequence in each case will not be counted. The same holds with respect to the evaluation switching member according to FIG. 5a. This error is, to be sure, very slight, since the probability of such a phase position of scanning and signal pulses with each other is very remote. By the maintenance of the aforementioned time relations with regard to the maximum admissible pulse sequence time $t_{Fab}$ for the scanning pulses, even this slight counting error, which merely represents an undercounting but not a multiple counting, is suppressed.

Figure 4D:
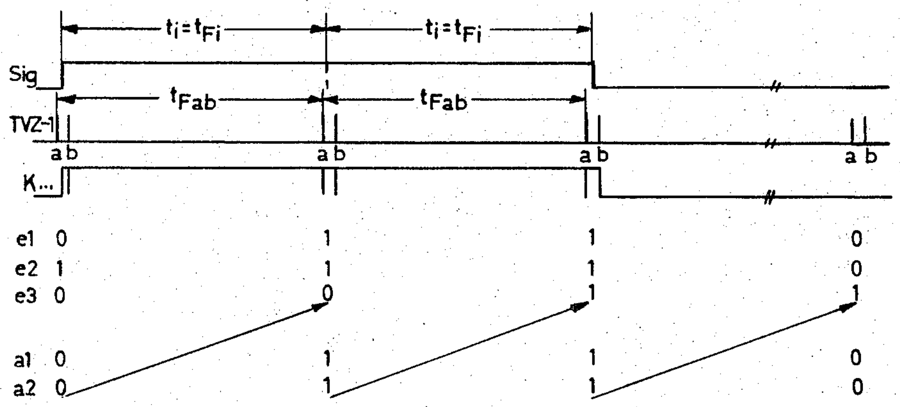

The time relation mentioned, in the case in which with smallest pulse sequence of the signal pulses to be picked up, there is formed a continuing direct current pulse without interruption by a pause or interval can even be disregarded. Such a case is illustrated in the pulse diagram according to FIG. 4d. Two signal pulses are represented which together form a continuing pulse of the length $2t_i=2t_{Fi}$. Here, after a result sequence "0"–"1," there always follows a result sequence "1"–"1" arising from the same signal pulse, and after this there follows finally the result sequence "0"–"0." A result sequence "1"–"0" following the result sequences "0"–1" . . . "1"–"1," corresponding to an impulse sequence according to FIG. 4, thus is not possible, since in the case $t_{Fi}$–$t_{Fa}$ the scanning impulse coinciding in each case with the end of the last signal pulse of a pulse sequence coincides therewith to the same extent as the preceding scanning impulse at the start of the same signal pulse. The scanning pulses in this case assume the signal frequency. The same holds for the evaluation switching member according to FIG. 5a. Accordingly, these two systems are completely independent of the pulse interval ratio of the signal pulse sequences to be picked up, if it is assumed that the signal pulse sequence of the next larger counting frequency is greater than the smallest signal pulse sequence time extended by the duration of the evaluation double pulse, which time corresponds to the smallest counting frequency.

Figure 6:
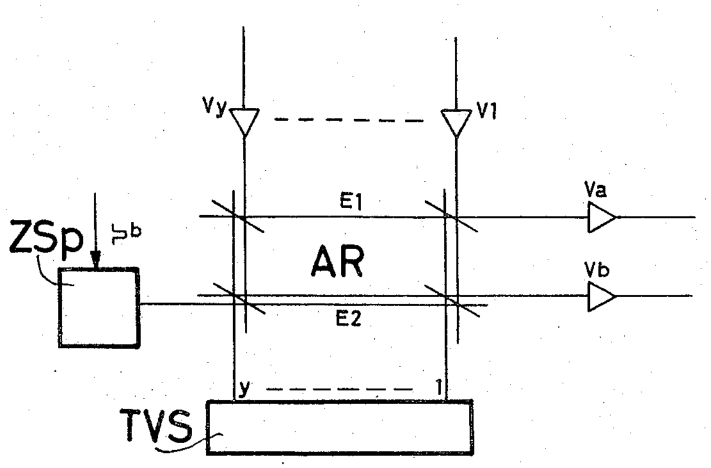
FIG. 6 shows a modification of the switching arrangement according to FIG. 1 for the simplification of the evaluation switching members according to FIGS. 2 and 3.

FIG. 6 illustrates a modification of the switching arrangement according to FIG. 1. In the previously described arrangement, the transfer of the information contained in the particular individual storage elements evaluated to the two storage groups E1 and E2 of the evaluation register AR1 takes place in such a way that the two storage groups are switched synchronously for pulse reception by the two pulses *a* and *b* of the evaluation double pulse successively by the line blocking circuit Z*sp*. With the use of ferromagnetic ring cores as storage elements this can be achieved by a method wherein the ring cores controlled by the line blocking circuit are in each case partially remagnetized, so that the ring cores in the case of an additional magnetization are flipped into the storage position "1," responsive to a signal pulse given by one of the corresponding information amplifiers V1 and V*y*, or, if the additional magnetization does not occur, remain in their original position.

In the arrangement according to FIG. 6, on the other hand, the control signal delivered by the individual information amplifiers V1 and V*y* is so dimensioned that it is, in and of itself, capable of switching the after-engaged storage elements of the evaluation register AR into the storage position. The arrangement is there constructed in such a way that with use in each case of only one delivering line 1 to *y* per, information amplifier V1 to V*y* for the corresponding storage elements of the two storage groups E1 and E2, the storage elements of the second storage group E2 are blocked, in the rest state, for reception of information, and that this blocking is removed only for the admission of the evaluation results obtained by the second impulse *b* of each evaluation double pulse. With the use of ferromagnetic ring cores as storage elements this blocking can be achieved by a corresponding reverse premagnetization.

As a result, the storage elements of the first storage group E1 in each transfer of the second evaluation result can be subsequently influenced. In a result sequence "0"–"1" delivered by the precircuited information amplifier, for example V1, the corresponding storage element of the first storage group E1 remains, in the transfer of the "0," in the rest position, but in the transfer of the following "1" it is likewise flipped into the storage position "1," that is, each result sequence "0"–"1" is converted by the evaluation register AR into a result sequence "1"–"1." Since in the evaluation switching members according to FIGS. 2a and 3a both result sequences "0"–"1" and "1"–"1" lead to the same result, in both evaluation switching members, accordingly the blocking gate S1 and the after-engaged mixing gate M1 can be eliminated, without the effect that the result sequences will be changed, as in the evaluation switching members according to FIGS. 4a and 5a and illustrated in the original charts of FIGS. 2b and 3b. With more favorable control conditions for the storage elements of the evaluation register $A_R$ there result, accordingly, with unchanged sequence charts, the same evaluation switching members as are represented in FIGS. 4a and 5a.

The total number of the monitorable signal lines, such as represented in FIG. 1, of an arrangement operating with one of the above mentioned systems is primarily determined by the time required by the registering device for the recording of a signal impulse. If it is assumed that this time is equal to $T_R$ and the column timing distributor TVS is actuated in the same time interval, there then results from the transit time $T_S$ for the column timing distributor TVS at $$T_S=y\cdot T_R$$

and the pulse sequence time $T_{FZ}$ for the line timing distributor TVZ, taking into account the duration $t_D$ for an evaluation double pulse, at $$T_{FZ}=y\cdot T_R+t_D$$

In the case of a given maximum admissible pulse sequence time $t_{Fab}$ for the scanning impulses, there follows from this the member $x$ of the scannable lines at $$x=\frac{t_{Fab}}{T_{FZ}}=\frac{t_{Fab}}{y\cdot T_R+t_D}$$

and the total number of the monitorable signal lines at $$xy=\frac{t_{Fab}}{T_R+t_{D/y}}$$

This number may, however, in dependence on the magnitude $t_D$ and $y$, deviate considerably from the maximum possible number, namely, $$xy'=\frac{t_{Fab}}{T_R}$$

The evaluation duration $t_D$ for the individual signal lines is negligible with respect to the processing duration $T_R$ of the registering device. If, for example, it is assumed that the evaluation duration $t_D$ is equal to the processing duration $T_R$ and $y=1$—that is, each storage element is individually evaluated by itself, then the total number of monitorable signal lines amounts to only 50% of the maximally possible number. This reduction, however, can be offset by the fact that the evaluation results obtained in the scanning of the individual storage elements K . . . are alternately fed to one of two evaluation registers, as illustrated in FIG. 1, and the two evaluation registers AR1 and AR2 are constantly scanned successively, in which process the feed-in to the one takes place during the evaluation duration of the other. The switch-over of the information amplifiers V1 to Vy to the input lines of the two evaluation registers is accomplished through the gates *m* and *n*, whose control inputs are connected in parallel to a common control signal line, which receives from the line timing distributor, control pulses of the half line frequency, so that, for example, in the evaluation of each odd line the evaluation register AR1 is operable and in the evaluation of each even numbered line the evaluation register AR2 is operable.

Figure 7:
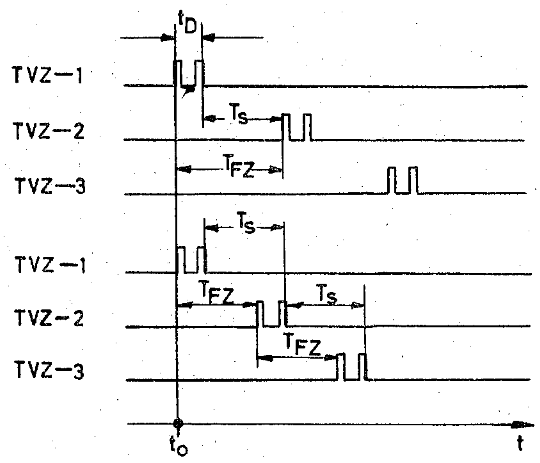
FIG. 7 shows an impulse diagram for the scanning of the individual storage elements according to FIG. 1.

FIG. 7 illustrates the relationships of the two possible line evaluation pulse sequence with equal transit time $T_S$ of the column timing distributor TVZ, each case illustrating the time position of the evaluation pulses for three successive lines, namely TVZ–1, TVZ–2, TVZ–3. With use of only one evaluation register the pulse sequence time $T_{FZ}$ for the scanning pulses of two successive lines is equal to the sum of the evaluation time $t_D$ and the transit time $T_S$ of the column timing distributor, since the storage release from the evaluation register can be initiated only when the line evaluation is completed. With use of two evaluation registers, on the other hand, the pulses sequence time $T_{FZ}$ can be so selected that it is equal to the transit time $T_S$ of the column timing distributor, the evaluation time $t_D$ being without influence on the total number of signal lines capable of being monitored. The lowest expenditure for the two evaluation registers results when the condition $$t_D = T_S = y \cdot T_R$$

is satisfied—that is, the number *y* of the signal lines to be scanned by lines is equal to the quotient of evaluation time $t_D$ and processing time $T_R$.

Otherwise the construction of the various components necessary for the practice of the individual systems according to the invention can be as desired, as long as they fulfill the necessary functions. This especially applies to the design of the timing distributors TVZ and TVS, the entire construction of the registering device including the adder stage, as well as for the individual storage elements K . . . and the evaluation register AR.

It is likewise immaterial for the invention, whether the scanning and registering apparatus operates constantly or, in a known manner, exclusively on demand, being started in each case by the first signal pulse coming in, and stopped when no other signal pulse is present.

The type of registration is likewise immaterial. While in the described arrangement according to FIG. 1 the registration is accomplished in such a manner that the arriving signal pulses are stored in a certain individual storage element to which a certain signal line is continuously allocated, it is likewise possible, according to another known method, in the presence of a registering signal at the output *a*1 of the evaluation switching member to record, instead of a signal pulse, the counter state of the scanning device. The counter states thus accumulating in random sequence, each of which represents a signal pulse, must, however, subsequently be released and likewise added up.

It is also possible without difficulty in the case of telecommunication lines with interposed connecting devices, for example relay sets of the first group selector in telephone installations, instead of the individual telecommunication lines, to scan the directly precircuited connecting devices, forming a channeling point over the individually allocated bistable storage elements. In the use of this likewise already known system, the registering signal at the output *a*1 of the evaluation switching member would extend over the circuitous path of the members still to be determined or already determined of the connected communication line, to a registration device, and in such a manner that each registering signal first releases the identification of the connected communications line or that the line numbers present are individually stored, are released for the registration. Also in the use of the basic features of the invention, the line number present can be directly recorded instead of a signal pulse, or can be employed for the control of individual line summation storage element.

For the scanning of precircuited connecting devices it is expedient to separately arrange the storage members for the control signals, necessary for the evaluation by the evaluation switching members, according to the system already proposed, and to individually scan them synchronously with the corresponding storage elements individually allocated to the respective connection devices.

Changes may be made within the scope and spirit of the appended claims which define what is believed to be new and desired to have protected by Letters Patent.

We claim:

1. In a system for the central registration of signal impulses arriving on various signal lines with or without interposed communication devices, in random sequence, but with a certain minimum time interval, as for example, rate impulses in long-distance systems, in connection with a plurality of single signal lines or interposed communication devices, such as a relay set of the first group selector stage, and having individually allocated bistable storage elements such as ferromagnetic ring cores for temporarily storing respective signal impulses, an interrogation device for cyclicly ascertaining the storage state of such storage elements, an evaluation network coupled with the output lines of the storage elements, said network comprising a component part of a registration device as an input control circuit whose recognized signal impulses are eventually recorded, the combination of said interrogation device being operable to produce scanning pulses, conducted to the storage elements over interrogation lines of the interrogation device, in the form of two pulses of the same polarity, following each other at a brief interval, each of which is capable of switching the storage element to be scanned, even in the simultaneous presence of a signal impulse, into its initial position, the pulse sequence time of the scanning pulses design as a double pulse being equal to or smaller than the smallest pulse sequence time of the signal pulses to be registered, but greater than or at least equal to the minimum duration of the effective signal pulses, an intermediate storer, said evaluation network comprising logical component parts having a total of 3 signal inputs, of which the first two are operatively connected with the output lines of the storage elements responsive to the respective pulses of the double interrogation pulses, the third signal input being connected with the output of said intermediate storer in which a pertinent binary control signal derived from the preceding evaluation is stored for the duration of a scanning cycle, said evaluating network having two control outlets, one of which is connected with the input of the registration device and the other with the input of said intermediate storer for the intermediate storing of the binary control signal derived in the particular evaluation.

2. A system according to claim 1, characterized by the feature that the evaluation switching member is constructed to effect the registration of a signal pulse as soon as such a pulse is recognizable by reason of the result sequence "0"–"1" or "1"–"1" given by the evaluation double pulse involved, and that the registration made in each case is characterized by storage of a corresponding control signal, and that, in the case of a recognizable signal pulse end with result sequence "1"–"0," a registration is effected only if it has not already taken place in the preceding evaluation.

3. A system according to claim 1, characterized by the feature that the evaluation switching member is constructed to effect the registration of a signal pulse as soon as the end of such a pulse is clearly recognizable on the basis of the result sequence "1"–"0" given by the evaluation double pulse concerned, and that, in the presence, for the first time, of a recognizable signal pulse with result sequence "0"–"1" or "1"–"1," only a control signal characterizing the registration still to be made is stored, and that by reason of this control signal a registration is effected in the succeeding evaluation, in which process simultaneously a new control signal is stored as soon as the presence of a signal pulse is again recognized.

4. A system according to claim 2, characterized by the feature that the interrogation device is so constructed that pulse sequence time of the scanning impulses is equal to or greater than the active impulse duration, extended by the duration of an evaluation double pulse, of the signal pulse to be picked up.

5. A system according to claim 2, characterized by the feature that the evaluation switching member is constructed to exclusively utilize the result sequence "1"–"1" as a signal for the recognized presence of a signal pulse, but that the result sequence "0"–"1" is without effect on the evaluation.

6. A system according to claim 5, characterized by the feature that the interrogation device is so constructed that with signal pulse sequences of the smallest pulse signal time with a pause between the individual signal pulses, the scanning-impulse sequence time is equal to or smaller than the smallest pulse sequence time shortened by the duration of an evaluation double pulse, of the signal pulses to be picked up.

7. A system according to claim 5, characterized by the feature that the interrogation device is so constructed that with pulse sequences of the smallest pulse sequence time without pauses between the individual signal pulses and thus forming a continuing pulse, the scanning sequence time is equal to the smallest pulse sequence time of the signal pulses to be picked up.

8. A system according to claim 1 for the pick-up of signal pulses distorted by rebound of the signal-giving contacts, characterized by the feature that the interrogation device is so constructed that the time interval of the two pulses forming the evaluation pulse is greater than the maximum possible rebound interval.

9. A system according to claim 1, characterized by the feature that the interrogation device is so constructed that the individual temporary storage elements are simultaneously evaluated in groups, the evaluation results obtained in the scanning being fed in parallel to the evaluation register, which according to the two evaluations results obtained from the evaluation pulse constructed as a double pulse, has two groups of storage elements, such evaluation register being thereupon scanned step by step.

10. A system according to claim 1, characterized by the feature that the interrogation device is so constructed that the individual temporary storage elements are evaluated in groups simultaneously, the evaluation results obtained in the scanning being fed alternately to one of two evaluation registers, each of which corresponds to one of the two evaluation results obtained from the evaluation pulse formed as a double pulse, each of said evaluation registers having two groups of storage elements, the two evaluation registers being continuously successively scanned, in which operation the feed-in to the one evaluation register takes place during the evaluation time of the other evaluation register.

References Cited

UNITED STATES PATENTS

| | | | |
|---|---|---|---|
| 3,001,021 | 9/1961 | Wright et al. | 179—7.1 |
| 3,173,994 | 3/1965 | Prescher et al. | 179—7.1 |

KATHLEEN H. CLAFFY, *Primary Examiner.*

H. ZELLER, *Assistant Examiner.*